United States Patent [19]
Schandl et al.

[11] Patent Number: 5,601,249
[45] Date of Patent: Feb. 11, 1997

[54] BRAKING DEVICE FOR MAGNETIC TAPE RECORDER

[75] Inventors: Hartmut Schandl, Vienna, Austria; Fritz Weisser, St. Georgen, Germany

[73] Assignee: Deutsche Thomson-Brandt GmbH, Villingen-Schwenningen

[21] Appl. No.: 437,919

[22] Filed: May 10, 1995

Related U.S. Application Data

[63] Continuation of Ser. No. 183,930, Jan. 21, 1994, abandoned, which is a continuation of Ser. No. 979,728, filed as PCT/EP91/00463 Mar. 13, 1991, abandoned.

[30]  Foreign Application Priority Data

Mar. 21, 1990 [DE]  Germany ............................ 40 08 996.7

[51] Int. Cl.⁶ .............................. G11B 15/32; G03B 1/04
[52] U.S. Cl. ........................ 242/355.1; 242/422.4; 360/74.1
[58] Field of Search ............................. 242/204, 156.2, 242/355, 355.1, 422.4; 360/96.1, 96.3, 74.1; 188/72.7, 72.9, 74

[56]  References Cited

U.S. PATENT DOCUMENTS

| | | | |
|---|---|---|---|
| 4,730,792 | 3/1988 | Jang | 242/204 |
| 4,807,061 | 2/1989 | Yoon | 360/74.1 |
| 4,899,951 | 2/1990 | Okada et al. | 242/204 |

FOREIGN PATENT DOCUMENTS

| | | |
|---|---|---|
| 0236962 | 9/1987 | European Pat. Off. |
| 0257597 | 3/1988 | European Pat. Off. |
| 4024316 | 7/1990 | Germany . |
| 59-172177 | 9/1984 | Japan . |

OTHER PUBLICATIONS

Patent Abstract Of Japan vol. 6 No. 229 Nov. 16, 1982 57-130258.
Patent Abstract Of Japan vol. 9 No. 30 Feb. 8, 1985 59-172177.

*Primary Examiner*—John Q. Nguyen
*Attorney, Agent, or Firm*—Joseph S. Tripoli; Joseph J. Laks; Francis A. Davenport

[57]  ABSTRACT

A braking device for a tape player/recorder includes a pair of reel platters and a pair of pivotable brake arms individually supporting brake pads. A tension member biases the brake pads against the reel platters in a brake-applied position. The brake arms have extensions extending to a selected point. A spring biased pivotable lever arm includes a tracking end and an actuating end. The actuating end engages the brake arms at the selected point to bias the brake pads away from the reel platters against the action of the tension member in a brake-released position. A lifting element is coaxial with a motor driven shaft and includes a helical ramp extending around the lifting element and rising from a lower level to a higher level. An adjusting element is coaxial with the shaft and is outside of the lifting element. The adjusting element includes lower and higher faces respectively coincident with the lower and higher levels of the ramp. The adjusting element also biases the pivotable lever from the lower face to the helical ramp to enable the tracking end of the lever to rise from the lower level to the upper level and place the braking device into the brake-released position. A clutch disengages the adjusting element from the shaft in the brake-released position.

14 Claims, 2 Drawing Sheets

BRAKING DEVICE FOR MAGNETIC TAPE RECORDER

This is a continuation of application Ser. No. 08/183,930, filed Jan. 21, 1994, abandoned, which is a continuation of application Ser. No. 979,728, filed Nov. 16, 1992, abandoned.

This application claims priority under 35 U.S.C. §120 from PCT application PCT/EP 91/00463 filed Mar. 13, 1991 by Hartmut Schandl and Fritz Weisser and titled "Braking Device".

The invention is directed to a brake mechanism for the winding reels or reel platters of a magnetic tape drive. Patent DE-OS 36 29 324 teaches the control of a brake mechanism using the threading motor of a magnetic tape recorder. A gearwheel, rack and pinion arrangement actuates a brake disk which controls the main brake. The gear wheel is driven by the shaft of the motor via a belt drive. The main brake applies a braking force to the reel platters and thus the reels of the magnetic tape after the tape is wound, and also prevents rotation of the reel platters when the device is switched off.

The invention provides a brake mechanism for the reel platters of a magnetic tape device which is simple in construction and cost-effective. With the invention, a threading motor which threads and unthreads the magnetic tape from cassette additionally controls the braking modes of the recorder. The main brake is applied to the reel platters, by means of a cylindrical lifting element which is firmly affixed to a shaft. The lifting element has a helical ramp upon which the tracking end of a pivotable control lever slides to actuate the main brake via the actuating end of the control lever. The shaft can be the shaft of the threading motor but this need not be the case. The operational position of the main brake, i.e. brake-applied or brake-released, is determined by the rotational direction of the shaft.

In the brake-applied position a spring biases the pivotable control lever about its pivot axis in a direction which causes the main brake to apply braking force against the reel platters. The tracking end of the pivotable lever lies in contact with a face of a cylindrical adjusting element which coaxially encloses the lifting element. The cylindrical adjusting element has two faces of different heights and the difference in height between the two faces corresponds to the highest and lowest points of the helical ramp of the lifting element. The tracking end of the pivotable control lever slides on the helical ramp and is biased onto the faces of the adjusting element to put the main brake into the brake-applied and brake-released positions. The adjusting element is rotated in one direction for the brake-applied position and the opposite direction for the brake-released position. A stop arrangement limits the degree of rotation of the adjusting element.

When the brake is in the brake-applied position, the tracking end of the pivotable lever contacts the lower face of the adjusting element. Upon further rotation of the shaft to the first detent of the stop arrangement the pivotable lever remains positioned on the lower face. When the rotational direction of the shaft is changed, the tracking end of the pivotable lever is biased from the lower face of the adjusting element onto the helical ramp of the lifting element. When the tracking end of the pivotable lever attains the height of the higher face the lever is biased onto the higher face, no longer contacts the lifting element. The actuation end of the pivotable lever then releases the brake. Consequently, the shaft can continue to rotate without reapplying the brake. Upon reversal of the rotational direction, the adjusting element turns a clutch until it meets another detent of the stop arrangement. During this rotating motion, the tracking end of the pivotable lever leaves contact with the higher face of the cylindrical adjusting element and the force of the spring pulls the tracking end of the pivotable lever onto the lower face of the cylindrical adjusting element and the main brake applies a braking force to the reel platters and thus the reel and tape.

Particular advantages of the inventive brake control are the short control time and the fact that a greater turning moment must be produced by the threading motor only during the relatively short lifting process, whereas for the other functions the threading motor must overcome only the moment of the sliding coupling, or clutch.

The invention is explained in more detail by means of the figures in which.

Figure 1:
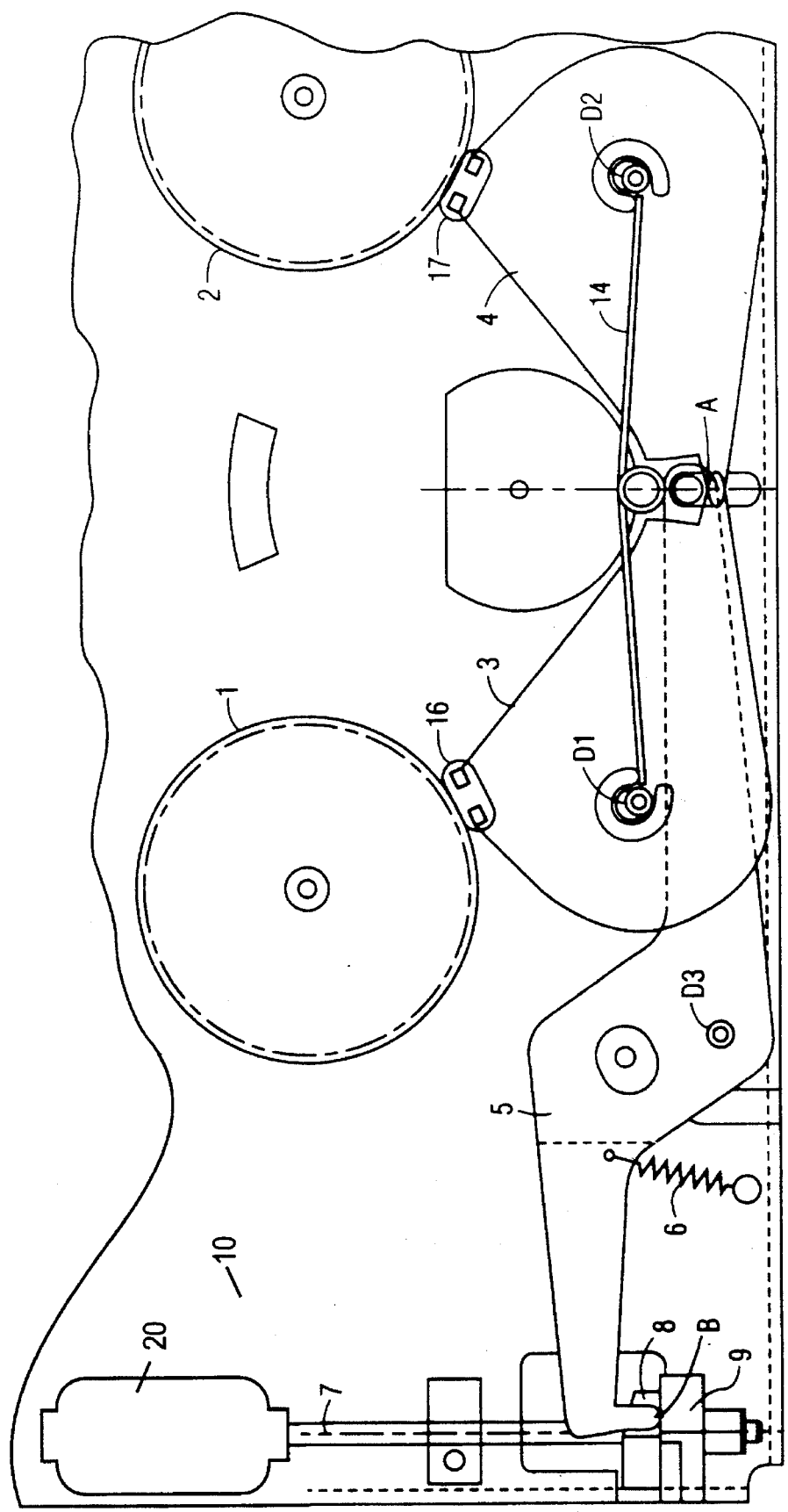
FIG. 1 is a top view of a preferred embodiment.
Figures 2, 2D:
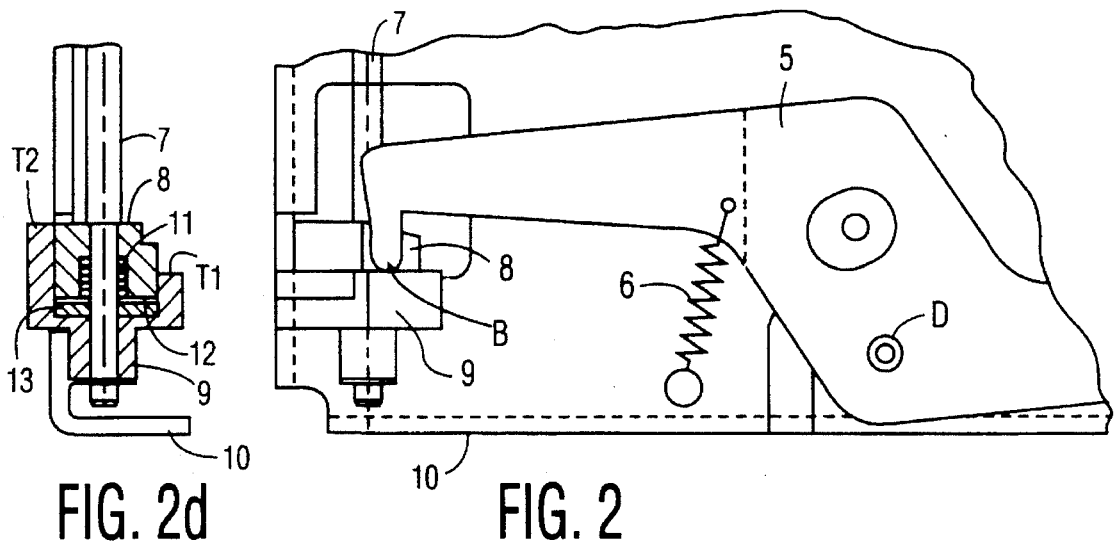
FIG. 2 is a magnified view of the preferred embodiment of FIG. 1.
FIG. 2d is a side view of the preferred embodiment of FIG. 2.

In FIGS. 1 and 2, winding reels or reel platters 1 and 2, for mounting a magnetic tape cassette are arranged on a chassis 10. Brake arms 3 and 4 are operated simultaneously by the spring tension of a torsion bar 14. The brake arms 3 and 4 respectively support brake pads 16 and 17 which are biased against the reel platters in the brake-applied position. The brake arms 3 and 4 are pivotably mounted on the chassis 10 at pivot points D1 and D2 and have extensions which contact the actuation end A of a pivotable lever 5. Lever 5 is fixed to the chassis 10 at a pivot point D3. In the brake-applied position, the pivotable lever 5 is biased by a spring 6 and the actuation end A of the lever 5 applies no force to the brake arms 3 and 4. Therefore, in the brake-applied position (shown in FIG. 1) the brake pads 16 and 17 contact the reel platters 1 and 2. The raising of the tracking end B of the pivotable lever 5 causes actuation end A of the lever to exert a force on the extensions of the brake arms 3 and 4, causing the brake pads 16 and 17 to be pivoted out of contact with the reel platters 1 and 2. The tracking end B of pivotable lever 5 is raised by a helical ramp of a lifting element 8. The lifting element 8 is mounted on and affixed to shaft 7 driven by motor 20. Accordingly, the tracking end B slides on the helical ramp against the force of spring 6 during the lifting process. In the brakes-released and brakes-applied positions the tracking end B of lever 5 is in contact with faces T1 and T2 respectively, of an adjusting element 9, which is coaxial with the lifting element 8 and a sliding coupling (clutch), composed of a spring 11, a metal disc 12 and a friction disc 13.

Figure 2A:
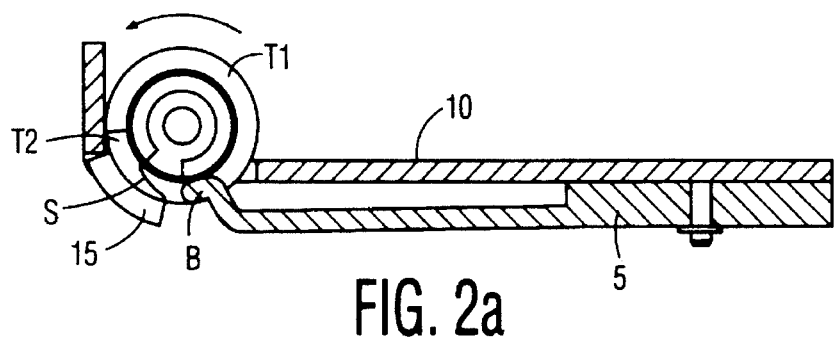
FIGS. 2a to 2c show different operating conditions of the preferred embodiment.
Figure 2B:
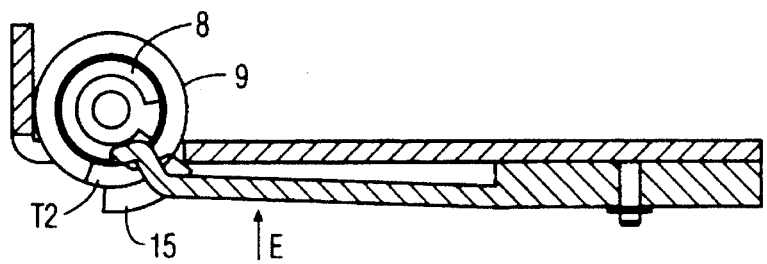
Figure 2C:
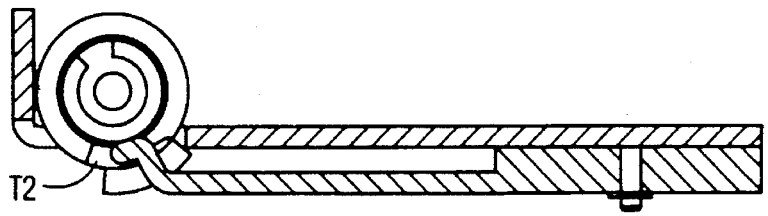

The various operating positions of tracking end B are shown in FIG. 2a to 2c. In FIGS. 2a and 2b, the adjusting element 9 has a projection 15 which contacts the chassis 10, to limit the rotational motion of the adjusting element 9 to a selected angle. Thus, the chassis 10 acts as a detent to limit rotation of the adjusting element 9. The two faces T1 and T2 are formed in a cylindrical casing of adjusting element 9 which is coaxial with and surrounds the lifting element 8. The different heights of the two faces T1 and T2 respectively correspond to the difference in the upper and lower heights of the circumferential helical ramp of lifting element 8. The upper face T2 extends approximately 90° around adjusting element 9 and has a shaped side wall S, shown in FIG. 2a, at the junction of the faces, the lower face extends approximately 270° around the adjusting element.

In FIG. 2a, which corresponds to the brake-applied position shown in FIG. 1 and FIG. 2, the tracking end B of pivotable lever 5 contacts the lower face T1 of adjusting element 9. Rotation of the shaft 7 in a direction opposite to that shown by the arrow maintains the brake-applied condition because the projection 15 of adjusting element 9 rests against the chassis 10 and the clutch, depicted in FIG. 2d, including the spring 11, metal disc 12 and friction disc 13, allows shaft 7 and helical ramp 8 to rotate within the adjusting element 9. When the direction of rotation of the shaft 7 is that shown by the arrow, the adjusting element 9 rotates until projection 15 contacts the other side of the chassis, whereupon the clutch slips (FIG. 2b). The chassis 10 therefore acts as a detent to limit angular rotation of adjusting element 9 in both directions. During the rotation of adjusting element 9 the pivotable lever 5 is biased inwardly and elastically deflected in the direction indicated by the arrow E (FIG. 2b) by the shaped side wall S of the T2 portion of adjusting element 9. The tracking end B of lever 5 is biased and guided onto the helical ramp of lifting element 8. As rotation of lifting element 8 continues, the adjusting element 9 remains in the brake-applied position shown in FIG. 2b and the tracking end B of pivotable lever 5 slides on the helical ramp of the lifting element 8 until the ramp height matches the height of face T2 of adjusting element 9. When the ramp height and face T2 are equal, the side wall S of T2 can no longer bias and elastically deform lever 5. Thus tracking end B is free to slide onto the T2 surface as a result of the biasing of elastically deflected pivotable lever 5, which then assumes a relaxed non-deflected position. When the tracking end B of lever 5 reaches face T2 the actuating end A of lever 5 applies a force to the ends of brake arms 3 and 4 and brake pads 16 and 17 move out of contact with reel platters 1 and 2. The braking action is thus terminated. The brake-released condition is maintained during further rotation of the shaft 7 in the direction of the arrow because of the clutch. However, when the direction of rotation of shaft 7 is changed in the direction opposite to that of the arrow, element 9 is rotated through an angle via the clutch coupling, causing the tracking end B to be abruptly lowered from surface T2 to the lower surface T1 by the force of spring 6, so causing the main brake to be actuated.

We claim:

1. In a braking device for a tape player/recorder having a pair of reels and a pair of pivotable brake arms individually supporting brake pads, a tension member acting on said arms for biasing said brake pads against said reels in a brake-applied position, said brake arms having extensions extending to a selected point, and a spring biased pivotable lever arm having a tracking end and an actuating end, said actuating end engaging said brake arms at said selected point to bias said brake pads away from said reels against the action of said tension member in a brake-released position, an improvement comprising:

a lifting element coaxial with a motor driven shaft, said lifting element having a helical ramp extending around said lifting element and rising from a lower level to a higher level;

an adjusting element coaxial with said shaft and circumferentially enclosing said lifting element, said adjusting element including lower and higher faces respectively coincident with said lower and higher levels, said adjusting element also including means for biasing said tracking end of said pivotable lever arm from said lower face corresponding to a brake-applied position to said helical ramp to enable said tracking end to rise from said lower level to said higher level and place said braking device into said brake-released position; and clutch means for disengaging said adjusting element from said shaft in said brake-released position.

2. The braking device of claim 1, further comprising means for biasing said tracking end of said pivotable lever arm toward said lower face to assure that upon rotation of said adjusting element, said lever abruptly moves from said higher face to said lower face to rapidly cause braking action.

3. A braking device for a tape player/recorder comprising:

a reel platter for mounting a magnetic tape reel;

a brake lever having a first and second end and pivotably mounted, said first end having a brake pad, biased by a spring means, to brake said reel platter;

a brake actuating lever pivotably mounted and having a first and second end, said first end being positioned for coupling with said second end of said brake lever to remove said brake pad from said platter;

a rotatable shaft;

a cylindrical lifting means, axially affixed to said shaft, said means having a first diameter section and a second larger diameter section, said second diameter section meeting said first diameter section to form a circumferential helical surface;

a slip coupling attached to an end of said cylindrical lifting means; and a cylindrical braking means axially mounted on said shaft, coaxial with said lifting means, and coupled thereto by said slip coupling, said cylindrical braking means having a radial projection to limit angular rotation about said shaft, an end surface generally orthogonal to said shaft, a lower surface and a higher surface, said second end of said brake actuating lever being biased into contact with said lower surface;

upon rotation of said shaft, said cylindrical lifting means rotates and couples said rotation to said braking means by said slip coupling, said second end of said brake actuating lever slides over said lower surface of said braking means, striking an edge of said higher surface and being deflected onto said circumferential helical surface, said braking means continues to turn until said radial projection detents to limit angular rotation whereupon said slip coupling slips, said shaft and said lifting means continue to rotate with said second end of said brake actuating lever deflected and sliding over said circumferential helical surface causing said brake actuating lever to pivot and couple said first end of said brake actuating lever with said second end of said brake lever to remove said brake pad from said platter, said circumferential helical surface lifts said deflected second end of said brake actuating lever until said helical surface attains the height of said higher surface of said braking means, whereupon said second end of said brake actuating lever slides radially to assume a non-deflected position on said higher surface of said braking means, thus sustaining brake release.

4. The braking device of claim 3, where upon rotation of said shaft in a reverse direction, said cylindrical lifting means rotates and couples said rotation to said braking means via said slip coupling, causing said second end of said brake actuating lever to slide over said higher surface of said braking means and abruptly move to said lower surface of said braking means responsive to said bias, thus pivoting said brake actuating lever allowing said brake lever and pad to brake said platter.

5. The braking device of claim 4, wherein said brake is applied within one revolution of said shaft.

6. The braking device of claim 4, wherein said brake is released slowly responsive to said helical surface rotation and said brake is applied rapidly responsive to said abrupt movement.

7. The braking device of claim 4, wherein a brake condition is unchanged by shaft rotation in a direction which caused said brake condition.

8. The braking device of claim 3, wherein said edge of said higher surface of said cylindrical braking means is shaped to guide said second end of said brake actuating lever toward said shaft to position said second end on said circumferential helical surface for lifting.

9. The braking device of claim 3, wherein said circumferential helical surface has a ramp height substantially equal in height to said height of said higher surface relative to said lower surface of said cylindrical braking means, and said ramp starts substantially equal in height to said height of said lower surface of said cylindrical braking means.

10. The braking device of claim 3, wherein said brake pad is released within one revolution of said shaft.

11. The braking device of claim 3, wherein said brake is released by revolution of said shaft in a first direction, and said brake is applied by revolution of said shaft in a reverse direction.

12. The braking device of claim 3, wherein said rotatable shaft is coupled to a threading motor.

13. A braking device for a tape player/recorder, comprising:

a reel platter for mounting a tape reel;

a motor;

a drive shaft coupled to said motor;

a lever being pivotably mounted for engaging and moving a brake pad between a brake-applied position in contact with said reel platter to prevent rotation of said reel platter and a brake-released position to enable rotation of said reel platter;

means for urging said brake pad toward said brake-applied position;

a first rotatable means coupled to said drive shaft for engaging and progressively pivoting said lever to move said brake pad toward said brake-released position; and, a second rotatable means coupled to said drive shaft for engaging said lever for maintaining said brake pad in said brake released position and for enabling said brake pad to be abruptly pivoted into said brake-applied position by said urging means.

14. A braking device for a tape player/recorder, comprising:

a reel platter for mounting a tape reel;

a threading and unthreading motor;

a drive shaft coupled to said threading and unthreading motor and operable to rotate in either direction;

a lever pivotably mounted and coupled for engaging and moving a brake pad between a brake-applied position in contact with said reel platter to prevent rotation of said reel platter and a brake-released position spaced from said reel platter to enable rotation of said reel platter;

a first rotatable means coupled to said drive shaft for engaging and progressively pivoting said lever and said brake pad into said brake-released position; and, a second rotatable means for engaging said lever and coupled to said drive shaft for enabling said brake pad to be abruptly pivoted into said brake-applied position from said brake-released position.

\* \* \* \* \*